(12) United States Patent
Nomura et al.

(10) Patent No.: US 6,308,023 B1
(45) Date of Patent: Oct. 23, 2001

(54) IMAGE APPARATUS HAVING A MULTIPLE NUMBER OF DIFFERENT FUNCTIONAL MODES

(75) Inventors: Tatsuo Nomura, Soraku-gun; Kouki Fukuda, Nara, both of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/596,293

(22) Filed: Jun. 16, 2000

(30) Foreign Application Priority Data

Jun. 22, 1999 (JP) .................................................. 11-175903

(51) Int. Cl.[7] .................................................. G03G 15/00
(52) U.S. Cl. .................................................. 399/81
(58) Field of Search ........................ 399/82, 81; 345/173

(56) References Cited

U.S. PATENT DOCUMENTS 5,046,931 * 9/1991 Knodt ..................................... 399/81
5,061,958 * 10/1991 Bunker et al. ......................... 399/81
5,218,406 * 6/1993 Ebner ................................. 399/81 X
5,880,727 * 3/1999 Barrett et al. ....................... 399/81 X
5,907,319 * 5/1999 Hashimoto et al. .................. 345/173
5,950,045 * 9/1999 Nomura et al. ........................ 399/81

FOREIGN PATENT DOCUMENTS 10-105001 * 4/1998 (JP) .

\* cited by examiner

*Primary Examiner*—Susan S. Y. Lee
(74) *Attorney, Agent, or Firm*—Dike, Bronstein, Roberts & Cushman IP Group; David G. Conlin; David A. Tucker

(57) ABSTRACT

An imaging apparatus has a display device which displays the information item as to image magnification conversion with a key set for setting the condition as to the magnification conversion in the approximately central area in the background frame. Further, the information item as to image density conversion with a key set for setting the condition as to the image density conversion in the approximately lower left area in the background frame. Arranged further in the approximately upper left area in the background frame are keys for commanding image processes including a duplex mode key and an edition mode key. The information items with key sets are adapted to be depicted with a color which is modified as to brightness and/or chroma from the green hue of the background frame.

6 Claims, 10 Drawing Sheets

FIG.5

| MODE | MODE HUE |
|---|---|
| COPY | GREEN |
| FACSIMILE | RED |
| PRINTER | BLUE |
| SCANNER | YELLOW |

IMAGE APPARATUS HAVING A MULTIPLE NUMBER OF DIFFERENT FUNCTIONAL MODES

BACKGROUND OF THE INVENTION (1) Field of the Invention

The present invention relates to an imaging apparatus capable of performing imaging in a plurality of modes.

(2) Description of the Prior Art

There have been high-functional and high-performance copiers developed in response to the market's demands, while there may occur the problem of such a machine being difficult for those who rarely use it to understand how to use because of the machine complexity.

There have been proposed a variety of multi-functional machines which, in addition to copy mode, have a multiple number of operation modes such as facsimile mode, printer mode, scanner mode, etc., and which allow the user to select a desired mode from the multiple modes and run the machine in the selected imaging mode. Machines of this kind should be provided as easy handling ones but they are generally hard to handle because of their high performances.

Under such circumstances, some recently commercialized copiers use a large display device in the control panel so as to provide careful and close guidance in the procedural job orders using pictorial representations with messages.

Such a configuration is able to provide understandable guidance for the user by displaying information with pictures and messages relating to the machine in the large display so as to allow the user to handle the machine without any concern. However, when a large display portion is used to provide many pieces of guidance information, the tonal representation has a limit because the display screen is monochrome, hence there is a limit to providing readily understandable guidance display of all the modes and functions.

A technology has been disclosed by the applicant hereof in Japanese Patent Application Laid-Open Hei 11 No.15400 wherein a largish LCD panel is provided on a control panel so that the external outline of the main apparatus with peripheral devices is displayed in the approximately center thereof with the machine related information displayed around the outline and once the machine has changed in its mode, image information with messages to be given to the user will be displayed in a successively transitional manner so as to provide guidance.

However, the more understandable the guidance display, the more detailed information needs to be prepared. Hence, the display image information becomes bulky though the machine as a product has high enough operativity. Since the levels of users may be unequal, there is a fear that some users may keep the machine itself at a distance because the information given by the monochrome display is still not enough to understand how to use.

Disclosed in Japanese Patent Application Laid-Open Hei 10 No.105001 is a copier having a multi-job mode which is provided with a color display device. However, this apparatus has a reservation copy function and provides only the guidance display of the contents of the reservation copy mode on the color display device by using a different color for each reservation copy mode and will not handle bulk display image information.

SUMMARY OF THE INVENTION

In order to solve the above problem it is therefore an object of the present invention to provide an imaging apparatus which is capable of providing guidance information of the operations readily understandable to the user by using a color display device as an information display means.

In order to achieve the above object, the present invention is configured as follows:

In accordance with the first aspect of the present invention, an imaging apparatus for imaging in a multiple number of different functional modes, includes: a display portion having an information display portion for displaying information as to imaging in each functional mode; an imaging portion for imaging based on the information displayed in the information display portion; and a display control portion for controlling the information display portion so that the information as to imaging in each functional mode will be displayed with a hue different from that in other functional modes while the display is depicted with a color which is modified as to, at least, brightness or chroma with respect to the hue.

In accordance with the second aspect of the present invention, an imaging apparatus is characterized in that the information display portion displays the information as to the imaging conditions in each functional mode so that they can be selected and the contents of the selected conditions can be confirmed.

In accordance with the third aspect of the present invention, an imaging apparatus is characterized in that when the apparatus is in a state where imaging can be effected in multiple different functional modes, the display control portion controls the information display portion so as to provide, at least, display guidances being a part of the information as to each of the multiple different functional modes with the associated color.

An imaging apparatus according to the fourth or fifth aspect of the present invention is characterized in that the information display portion for each functional mode, at least, includes a basic information display group for displaying basic information for imaging and a special information display group for displaying special information, and the display control portion controls the information display portion so that the basic information display group is depicted with an intense color while the special information display group is depicted with a non-intense color.

An imaging apparatus according to the sixth or seventh aspect of the present invention is characterized in that the information display portion for each functional mode is, at least, composed of a basic information display group for displaying basic information for imaging and a special information display group for displaying special information in a background color, and the display control portion controls the information display portion so that the basic information display group is depicted with a color having a large color difference from the background color while the special information display group is depicted with a color having a small color difference from the background color.

BRIEF DESCRIPTION OF THE DRAWINGS

FIG. 5 is a management table showing the preset hues representing various functional modes;

DESCRIPTION OF THE PREFERRED EMBODIMENTS

The embodiment of the present invention will hereinafter be described with reference to the accompanying drawings.

Figure 1:
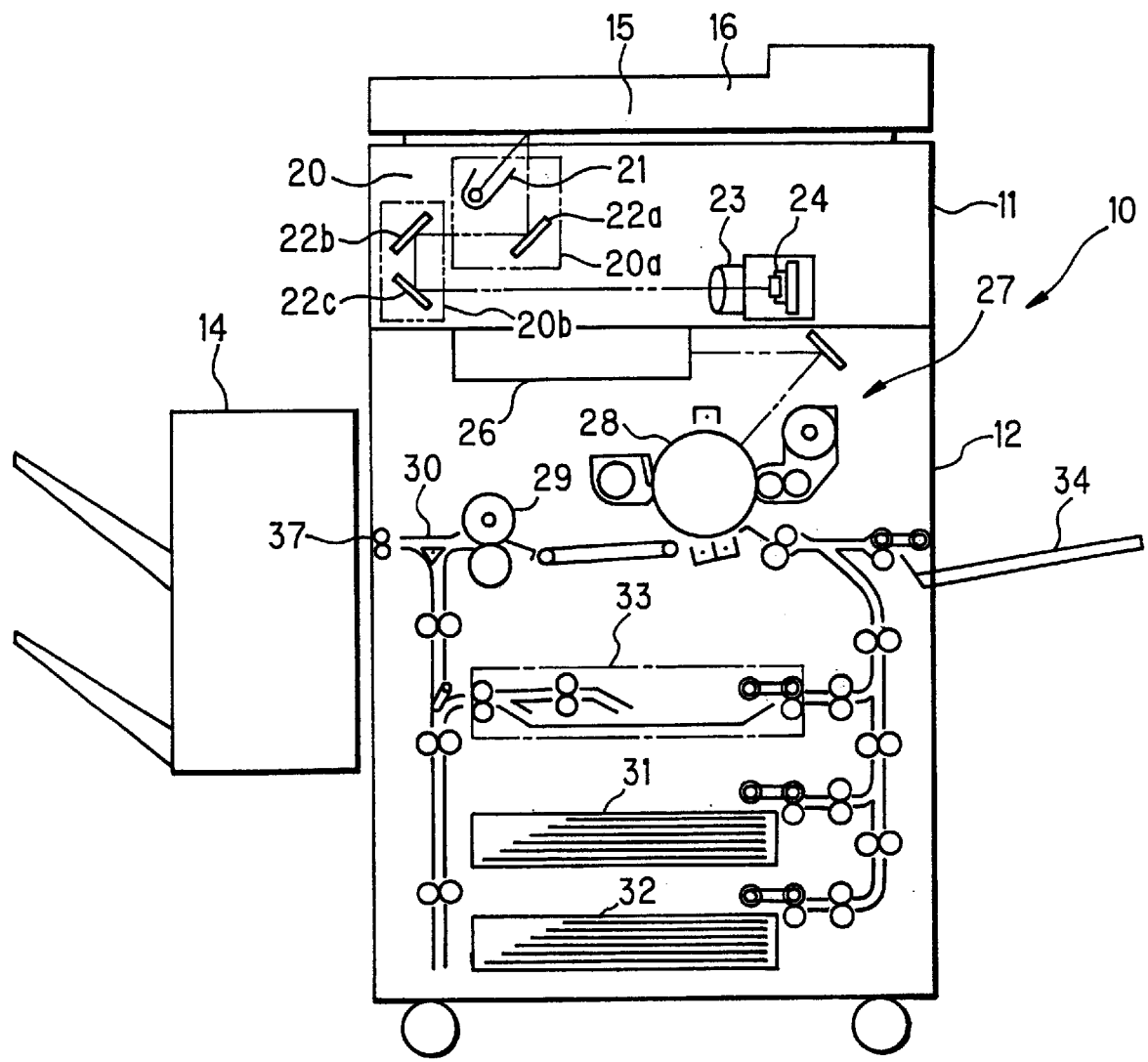
FIG. 1 is a sectional view showing the overall configuration of a digital copier having a control panel.

The embodiment comprises, for example, a digital imaging apparatus having a copy mode, printer mode, facsimile mode etc. FIG. 1 is a sectional view showing the overall configuration of a digital imaging apparatus having a control panel. This imaging apparatus is a digital copier 10, which is mainly composed of a scanner portion 11 for reading an original image and a laser recording portion 12 for forming an image and recording it on a sheet.

Scanner portion 11 comprises an original table 15 made up of transparent glass; a reversible automatic document feeder (RADF) 16 automatically feeding originals to original table 15, and a scanner unit 20 or original image reading unit for scanning the image of the original placed on original table 15 to capture the original image. The original image captured by scanner portion 11 is sent to the image data input portion, which will be described later, where the image data is subjected to the designated image processing.

RADF 16 has a stack of original documents placed on its unillustrated original tray and automatically feeds the originals thus set, sheet by sheet, onto original table 15 in scanner unit 20. RADF 16, in order to enable scanner unit 20 to read one side or both sides of the original document in accordance with the operator's choice, comprises a sheet feed path for single-sided originals, a sheet feed path for double-sided originals, a feed path switching means, a group of sensors for monitoring and controlling the state of originals passing through different sites, a controller and the like. Since there conventionally have been many applications and many commercial models concerning RADF 16, no further explanation will be made.

Scanner unit 20 constituting scanner portion 11 for reading the image of the original placed on original table 15 comprises a lamp reflector assembly 21 for radiating the original surface with light, a first scan unit 20a having a first reflective mirror 22a reflecting the light reflected from the original to a photoelectric converting device (CCD 24), a second scan unit 20b having second and third reflective mirrors 22b and 22c for guiding the light reflected from the first reflective mirror 22a to CCD 24, an optical lens 23 for focusing the reflected light from the original passing through the above reflective mirrors, onto CCD 24 for converting the light into an electric image signal, a CCD 24 already mentioned for converting the reflected image from the original into an electric image signal.

Scanner portion 11 is configured to pick up original images by moving scanner unit 20 along the underside of original table 15 whilst successively placing the originals to be read, on original table 15 by the associated operation of RADF 16 and scanner unit 20. Specifically, the scan is controlled in such a manner that first scan unit 20a moves at a constant velocity V from the left to the right along the original table 15 while second scan unit 20b moves at half the rate of the velocity V, i.e., V/2, in parallel in the same direction. Thus, the image of the original placed on original table 15 is focused onto CCD 24 so that it successively reads the information of the original image line by line.

The image data thus obtained by reading the original image through scanner unit 20, is transferred to the image processor to be described later, where various types of processing are performed. Then, the data is temporarily stored in the memory of the image processor. The image data stored in the memory is loaded in accordance with the output instructions and transferred to a laser printer portion 12 where the image is produced on the sheet for recording. Laser printer portion 12 comprises a conveying system for conveying sheets as the recording material on which the image is formed and image forming portion 27 for forming images. Image forming portion 27 has a laser writing unit 26 and an electrophotographic processing unit 28 for forming images.

Laser writing unit 26, comprises a semiconductor laser beam source for emitting laser beams in accordance with the image data which has been captured in the memory by scanner unit 20 and is loaded therefrom, or in accordance with the image data transferred from an external apparatus, a polygonal mirror for deflecting the laser beam at an equi-angular velocity, and an f-theta lens for correcting the scanning laser beam deflected at an equi-angular velocity so that the laser beam having passed therethrough scans at a constant velocity the photosensitive drum constituting electrophotographic process unit 28.

Electrophotographic processing unit 28, as is well known, includes a charger, developing unit, transfer device, separator, cleaning unit and charge erasing unit, all provided around the photosensitive drum.

The sheet conveying system comprises: a sheet conveyer portion for conveying a sheet P to the aforementioned electrophotographic processing unit 28 for image forming, specifically, the transfer station where a transfer device is arranged; cassette feeders 31 and 32 for feeding a sheet P to the aforementioned sheet conveyer portion; a manual paper feeder 34 for feeding a sheet of a desired size as appropriate; fixing unit 29 for fixing the toner image or the image formed on sheet P after transfer; and a re-feeding path 33 for re-feeding sheet P in order to form another image on the rear side of sheet P with an image fixed on one side thereof.

Provided on the downstream side of fixing unit 29 is a post-processing unit 14 receiving the sheet P with an image recorded thereon and subjecting it to the designated process.

By the functions of laser writing unit 26 and electrophotographic processing portion 28 in image forming portion 27, the image data loaded from the image memory is supplied to laser writing unit 26 where the laser beam is processed to thereby so as to scan the photosensitive drum and hence form an electrostatic latent image on the surface of the photosensitive or drum in electrophotographic processing unit 28. Then, the latent image is visualized with toner, and the toner image is electrostatically transferred and fixed onto the surface of the sheet which has been fed from one of the paper feeders in the multi-paper feeder unit.

The paper with an image thus formed thereon is conveyed from fixing unit 29 via a discharging roller 37 into post-processing unit 14.

(Explanation of the Circuits in the Image Processor)

Next, the configuration and function of the image processor for performing image processing of the original image information thus captured, in digital copier 10 will be described.

Figure 2:
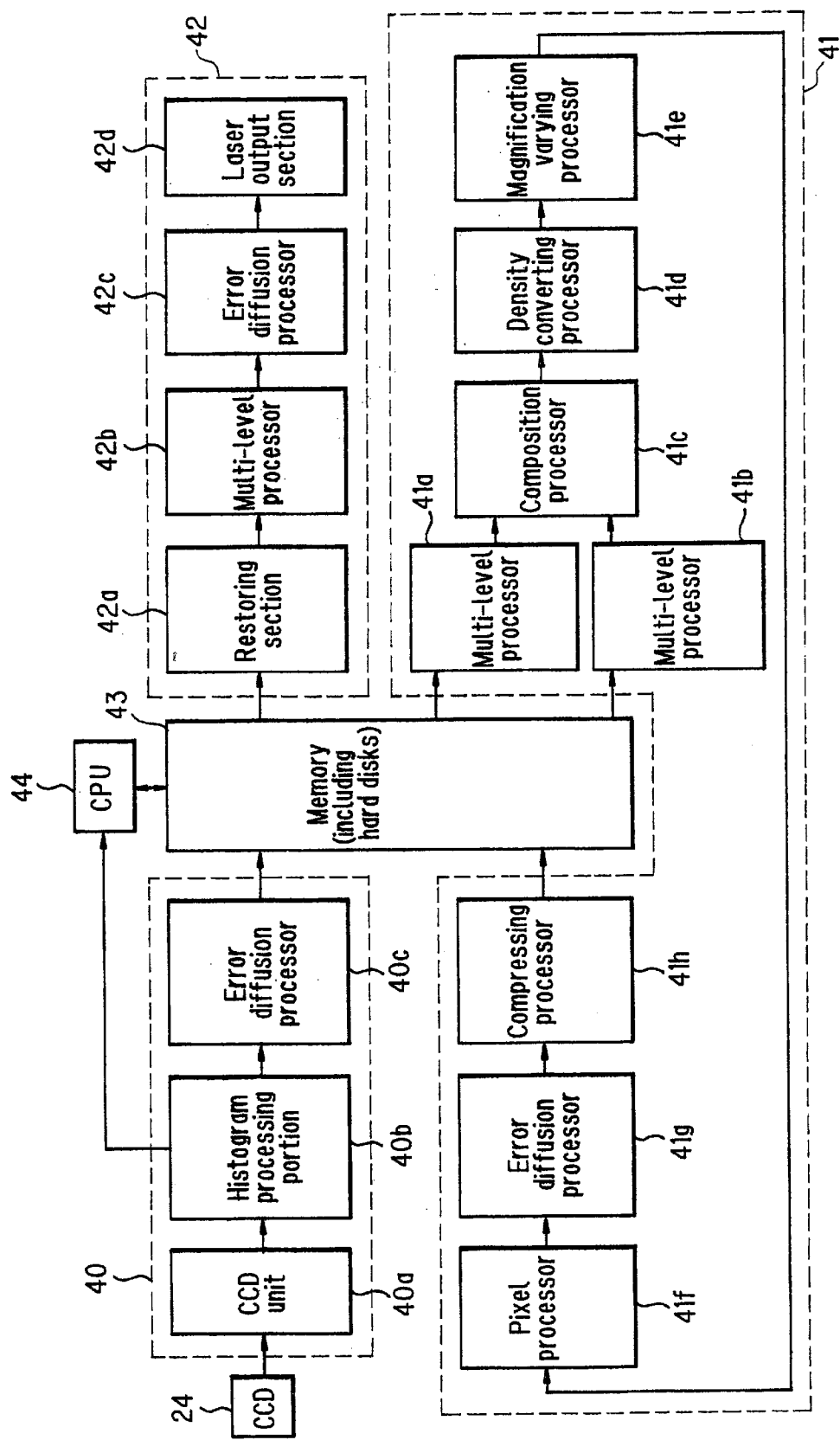
FIG. 2 is a block diagram showing the image processor contained in a digital copier.

FIG. 2 is a block diagram showing the image processor contained in digital copier 10 shown in FIG. 1. This image processor comprises: an image data input portion 40; an image processing portion 41; an image data output portion 42; a storage 43 made up of RAM (random access memory), hard disks etc.; and a central processing unit (CPU) 44.

Image data input portion 40 has a CCD unit 40a, a histogram processing portion 40b and an error diffusion processor 40c. Image data input portion 40 binarizes the image data of the original read through CCD 24, so as to produce a histogram of the digital binary data and processes the image data based on the error diffusion method and temporarily stores it into memory 43. More specifically, in CCD portion 40a, the analog electric signal corresponding to image densities in the image data is A/D converted and the converted data is subjected to the MT correction, B/W correction or gamma correction so as to be output as a digital signal of 256 levels of gradations (8 bits) to histogram processing portion 40b.

In histogram processing portion 40b, the digital signal output from CCD portion 40a is added to every level of density, made up of 256 levels of gradations, so as to produce density information (histogram data). The thus obtained histogram data is sent to CPU 44, as required, or sent to error diffusion processing portion 40c as pixel data.

Error diffusion processing portion 40c converts the digital signal of 8 bits per pixel output from CCD portion 40a into one bit (binary) based on the error diffusion method, one of pseudo intermediate processing, i.e., the method of using the binary error to determine binary values for neighboring pixels, so as to perform re-distributing computation for achieving exact and fine reproduction of local area density in the original.

Image processing portion 41 includes multi-level processors 41a and 41b, a composition processor 41c, a density converting processor 41d, a magnification varying processor 41e, a pixel processor 41f, an error diffusion processor 41g and a compressing processor 41h.

Image processing portion 41 is the processor which completes the conversion from the input image data into that desired by the operator. That is, the input data is processed through this processor until the completely converted output image data is stored into memory 43. It should be noted that the above processing sections contained in image processing portion 41 will operate as required or may not operate at all. Multi-level processors 41a and 41b revert the binary data which was binarized through error diffusion processor 40c, to 256 levels of data.

Composition processor 41c selectively performs logical operations for every pixel, i.e., logical sum, logical product or exclusive OR. The pixel data stored in memory 43 and the bit data from the pattern generator (PG) are the target of the logical operations. Density converting processor 41d sets up an arbitrary relationship between the input density and output density for the signal of 256 levels of data, based on the predetermined gradation converting table.

Magnification varying processor 41e performs interpolation of the known input data in accordance with the designated magnification ratio so as to determine the data (density values) of pixels for the associated pixels after magnification change. This magnification change is performed first, along the auxiliary scan direction and then along the main scan direction. Pixel processor 41f performs a variety of image processings to the input pixel data and also collects information on the data stream, such as extracting the features of the data. Error diffusion processor 41g performs a similar process to that implemented in error diffusion processor 40c of image data input portion 40. Compressing processor 41h compresses the binary data based on the run-length coding. For the compression of the image data, the compression starts to function at final processing loop after the final output image data is completed.

Image data output portion 42 includes: a restoring section 42a; a multi-level processor 42b; an error diffusion processor 42c; and a laser output section 42d. Image data output portion 42 restores the image data stored in memory 43 in compressed form, back to the original state, i.e., 256 tonal levels. This image data output portion performs error diffusion based on 4-levels of data which produces a gentler halftone representation than that of binary data and transfers the data to laser output section 42d.

Accordingly, restoring section 42a restores the image data which was compressed through compressing processor 41h, to the original state. Multi-level processor 42b performs a similar process to that implemented in multi-level processors 41a and 41b. Error diffusion processor 42c performs a similar process to that implemented in error diffusion processor 40c in image data input portion 40. Laser output section 42d, based on the control signal from an unillustrated sequence controller, converts digital pixel data into the on/off signal for the laser so as to activate or deactivate the semiconductor laser in laser writing unit 26 (FIG. 1), thus producing a static latent image on the photosensitive drum 28.

The data handled in image data input portion 40 and image data output section 42 is basically stored in memory 43 in the form of binary data in order to save the capacity of memory 43. However, it is also possible to process the data in the form of 4-levels of data, taking into account the degradation of the image data.

(Explanation of the Control Configuration of the Whole Digital Copier)

Figure 3:
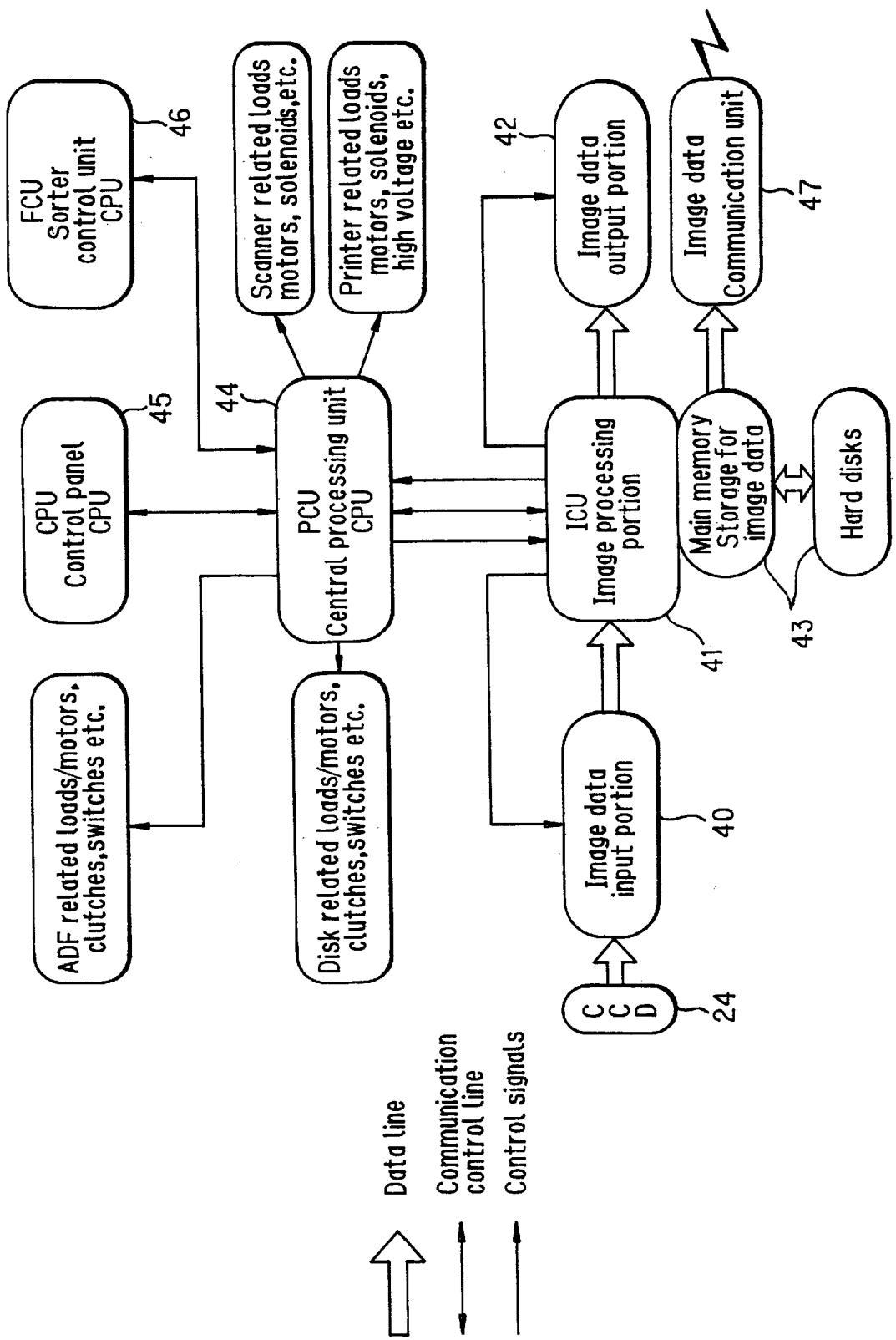
FIG. 3 is a block diagram showing the operation control configuration of a central processing unit governing individual units in the entire digital copier.

FIG. 3 is a diagram showing a central processing unit (CPU) 44 controlling the operations of all the components of digital copier 10 (FIG. 1). Explanation concerning CCD 24, image data input portion 40, image processing portion 41, image data output portion 42, image memory 43 and central processing unit (CPU) 44 is contained in FIG. 3, is omitted to avoid repetition.

Central processing unit 44 controls drive components constituting digital copier 10 shown in FIG. 1, such as RADF 16, scanner portion 11 and laser printer portion 12, by sequence control and outputs control signals to each of them. Central processing unit 44 is connected with a control panel 45 in an inter-communicable manner so that control signals in accordance with the copy mode designated by the operator are transferred to central processing unit 44 to thereby operate digital copier 10 in accordance with the setup mode.

A control signal indicating the operating state of the digital copier is transferred from central processing unit 44 to control panel 45. Based on this signal, control panel 45 displays the operating state, i.e., in what state the copier is, to the operator, by means of the display portion, etc.

Designated at 46 is a sorter control unit, which controls the operation of the post-processing unit which implements sorting of the copies output from digital copier 10 or other operations. Designated at 47 is an image data communicating unit for providing information exchange of image data, image control signals etc., with other digital image appliances.

Figure 4:
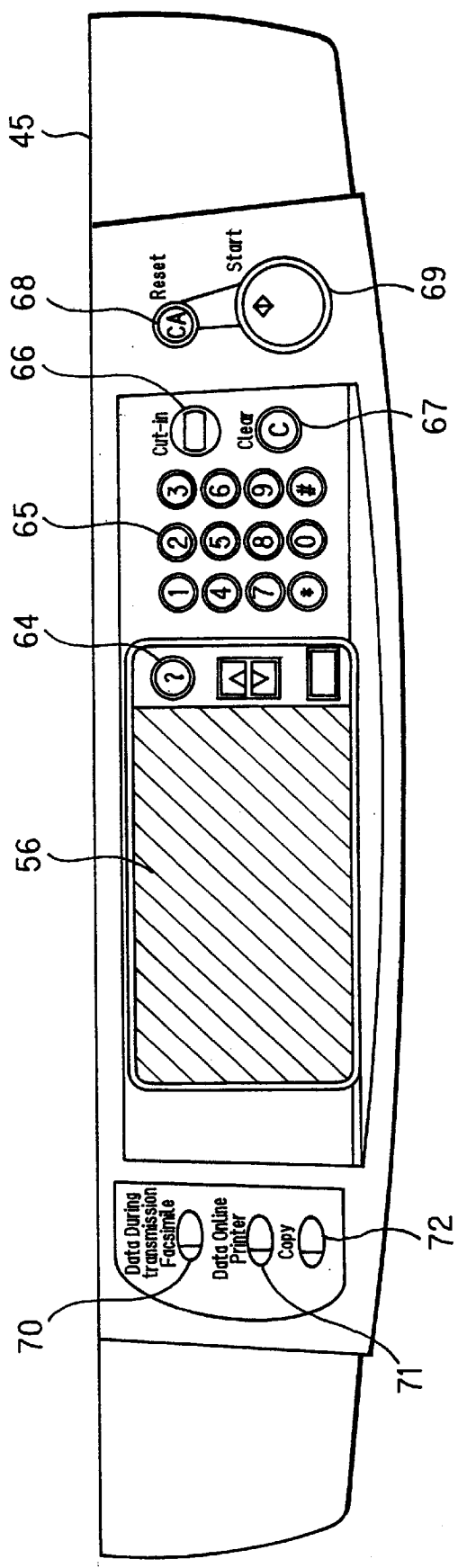
FIG. 4 is an outline showing an example of the control panel in a digital copier.

FIG. 4 shows the control panel of digital copier 10.

Arranged in the center of this control panel is a touch panel type liquid crystal display device 56. This panel has a group of mode setup keys arranged on the periphery thereof. On the screen of touch-type LCD device 56, the basic start frame is constantly displayed to allow for mode selection. When an area representing a desired mode is directly pressed with the finger, the display on the LCD screen changes successively so that the user can select one of the modes. An editing function can be set up when the operator touches with their finger the area where the desired function is displayed.

The layout of the setting keys arranged on the control panel will be briefly described.

Designated by 64 is a control guide key for displaying the control method of the screen; 65 a number keypad for inputting numerical information such as the copy number etc.; 66 a cut-in key for permitting a different copy mode to be cut into the currently processing copy mode; 67 a clear key for clearing the conditions set up through the numeric keypad etc.; 68 an reset key for canceling and reverting the setting state of the digital copier to the standard state; and 69 a start key for starting the operation in the mode setup through these keys. The three keys arranged on the left side on control panel 45 are mode selectors for facsimile mode 70, printer mode 71 and copy mode 72, from the top to the bottom, respectively.

The control panel and the keys arranged on the control panel presented here are just an example, and the arrangement of keys on the control panel will needless to say be different depending upon the functions installed to the digital copier.

Next, display states of the information associated with multiple imaging modes in the present invention will be described by taking an example of a digital multi-functional machine (digital copier 10).

As stated above, the digital multi-functional machine (digital copier 10) has multiple functional modes of processing image information, such as copy mode, facsimile mode, printer mode (the mode in which image is formed based on the image data sent from an external appliance) and scanner mode (the mode in which the image data captured by a scanner is transmitted to a specific external appliance).

As illustrated with FIG. 4, provided on control panel 45 of this digital multi-functional machine (digital copier) is a color LCD device 56 having a color display element as a means for providing a variety of information to the user. Central processing unit 44 (FIG. 3) controls LCD device 56 on control panel 45 so as to display information and causes image forming portion 27 (FIG. 1) to form an image in accordance with the input conditions set by the operator and record the image on a sheet of paper. This color display device 56 is manipulated so as to make understandable to the user the guidance display of the information as to the aforementioned different functional modes.

Now, the manipulation for guidance display will be described.

FIG. 5 is a management table showing the preset hues representing individual functional modes in this digital multi-functional machine (digital copier 10). This control table is stored in memory 43 (FIG. 2) so that central processing unit 44 causes LCD device 56 (FIG. 4) to perform display based on the hues of this table.

Description herein will be made on the assumption that green designates the copy mode, red the facsimile mode, blue the printer mode and yellow the scanner mode. However, the colors representing different modes can be interchangeable or can be set at will.

(The Display Frame in Copy Mode)

Figure 6:
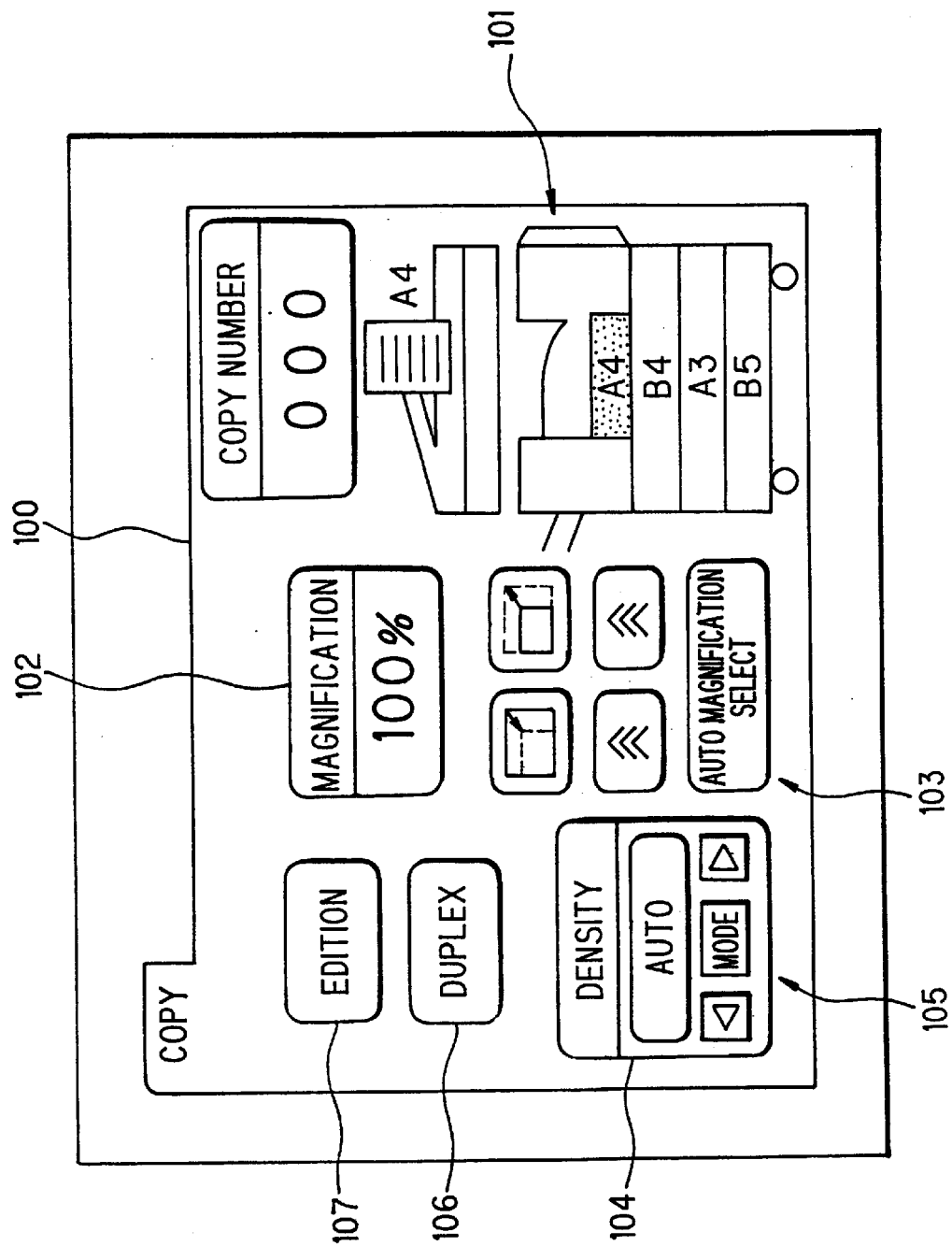
FIG. 6 is an external outline showing the display frame in copy mode.

FIG. 6 shows the display frame in copy mode. This frame is configured of sets of information relating to the copy mode over a green background 100.

An external outline 101 of the digital copier is displayed in the approximately right area in background 100 so as to allow for confirmation of the current status of digital copier 10 such as the recording paper size, the conditions of peripherals, and the like. Displayed in the approximately center in background frame 100 are an information item 102 as to the image magnification conversion and a key set 103 for setting the magnification conditions. Further, displayed in the approximately lower left area in background frame 100 are an information item 104 as to the image density conversion and a key set 105 for setting the image density conditions. Displayed in the approximately upper left area in background frame 100 are an duplex copy key 106 and edition key 107 for designating image processing. Once this duplex copy key 106 or edition key 107 is operated, the basic display frame switches into a detailed setting frame for the duplex mode or edition mode so as to allow for setting of detailed items as to the selected mode.

In the display frame shown in FIG. 6, the information display means (detailed information items in copy mode and key sets for setting the details in the copy mode) displayed in green background 100 should be depicted with a color which is modified as to brightness and/or chroma with respect to the green hue of the background frame. This allows the user to readily understand that the frame indicates the information (information items and the contents of the key sets) as to the copy mode.

Further, if among the information item indicators and key sets displayed in background frame 100, information item indicators 102 and 104 and key sets 103 and 105 for magnification, density and the like, which are basic for the imaging operation may be represented with an intense color, for example a dark color, while special information item indicators 106, 107 and key sets for edition and duplex copy, which are not frequently selected may be represented with a non-intense color, for example a light color, so that the display will appear hierarchically in color and the display contents will be easily understandable to the user.

Alternatively, if among the information and key sets displayed in background frame 100, basic information item indicators 102 and 104 and key sets 103 and 105 for magnification, density and the like may be represented with a color having a large color difference from that of background frame 100 while special information item indicators 106, 107 and key sets for duplex copy, edition and the like, which are not frequently selected may be represented with a color having a small color difference from that of background frame 100, so that the display will appear hierarchically in color and the display contents will be visually easily understandable to the user.

(The Display Frame in Facsimile Mode)

Figure 7:
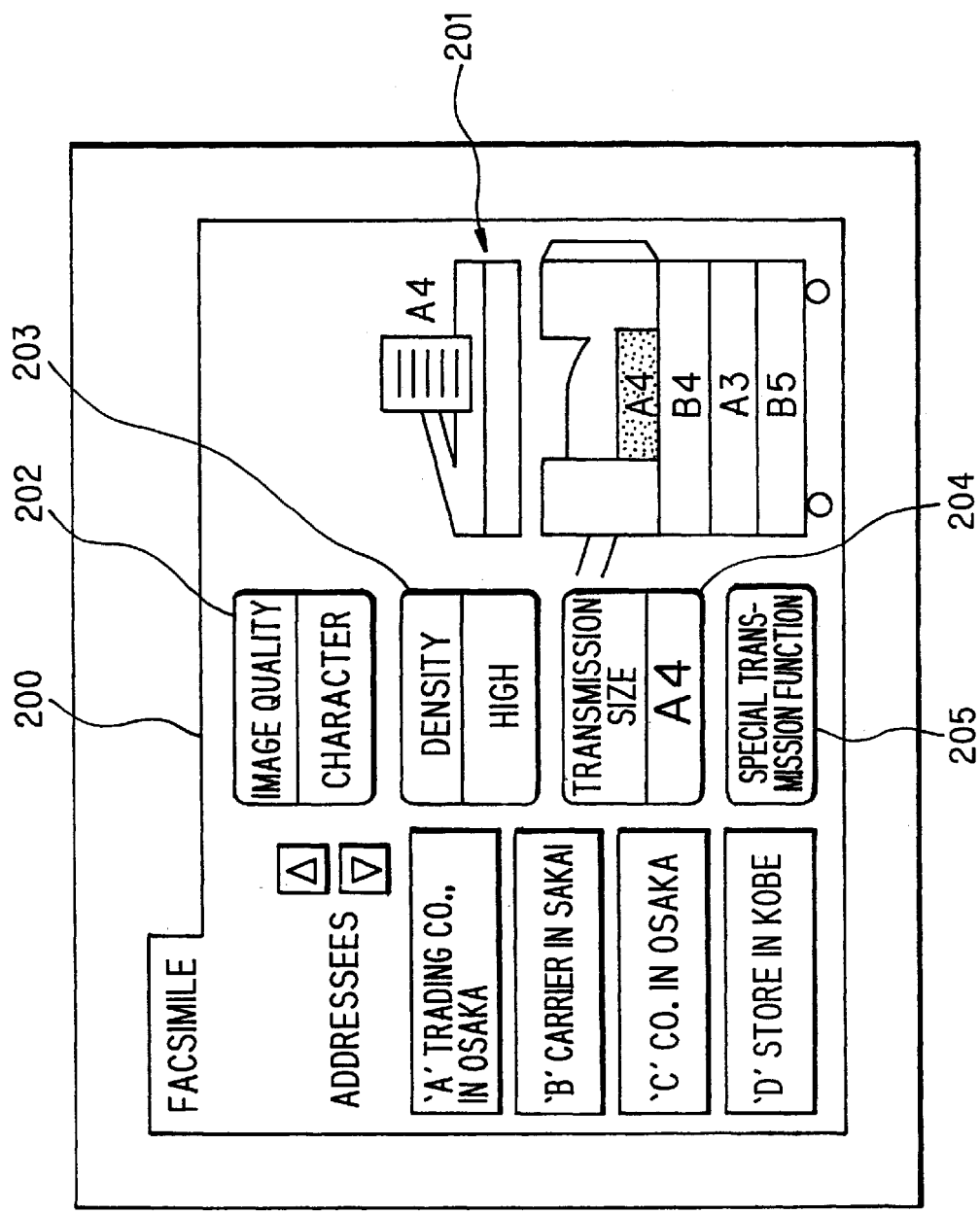
FIG. 7 is an outline showing the display frame in facsimile mode.

FIG. 7 shows the display frame in facsimile mode. This frame is configured of sets of information relating to variational modes over a red background 200.

An external outline 201 of the digital copier is displayed in the approximately right area in background 200, so as to allow for confirmation of the current status of this digital copier such as the recording paper size, the conditions of peripherals, and the like. Displayed in the approximately center in background frame 200 are a key for designating the image quality of the sending originals with a display portion 202 for confirmation of the set condition (image quality), a key for designating the image density of the sending originals with a display portion 203 for confirmation of the set condition (image density), a key for designating the output size of the sending originals with a display portion 204 for confirmation of the set condition (size), and a command key for allowing for switching into another frame for setting a special transmission mode. Once this special transmission mode key 205 is operated, transit functions other than the basic transmission mode such as confidential transmission, broadcast, etc. can be set up. Addressee information such as names and addresses to which originals are to be sent are displayed in a successive manner in the approximately lower left area in background frame 200 so as to allow the user to select desired addressees from the display.

In the display frame shown in FIG. 7, the detailed information as to the facsimile mode and a group of keys designating the details in the facsimile mode, displayed in red background 200 should be depicted with a color which is modified as to brightness and/or chroma with respect to the red hue of the background frame. This provides easy visual understanding to the user that the frame indicates the display information as to facsimile mode.

Further, if among the information and key sets displayed in background frame 200, information item indicators and key sets as to addressees, which are basic for the imaging operation may be represented with an intense color, for example a dark color, while special information item indicators such as transmission mode etc., which are not frequently selected may be represented with non-intense color, for example a light color, so that the display will appear hierarchically in color and the display contents will be easily, visually understandable to the user.

Alternatively, if among the information and key sets displayed in background frame 200, information item indicators and key sets as to addressees, which are basic for the imaging operation may be represented with a color having a large color difference from that of background frame 200 while special information item indicators and key sets for transmission mode and the like, which are not frequently selected may be represented with a color having a small color difference from that of background frame 200, so that the display will appear hierarchically in color and the display contents will be visually easily understandable to the user.

(The Display Frame in Printer Mode)

Figure 8:
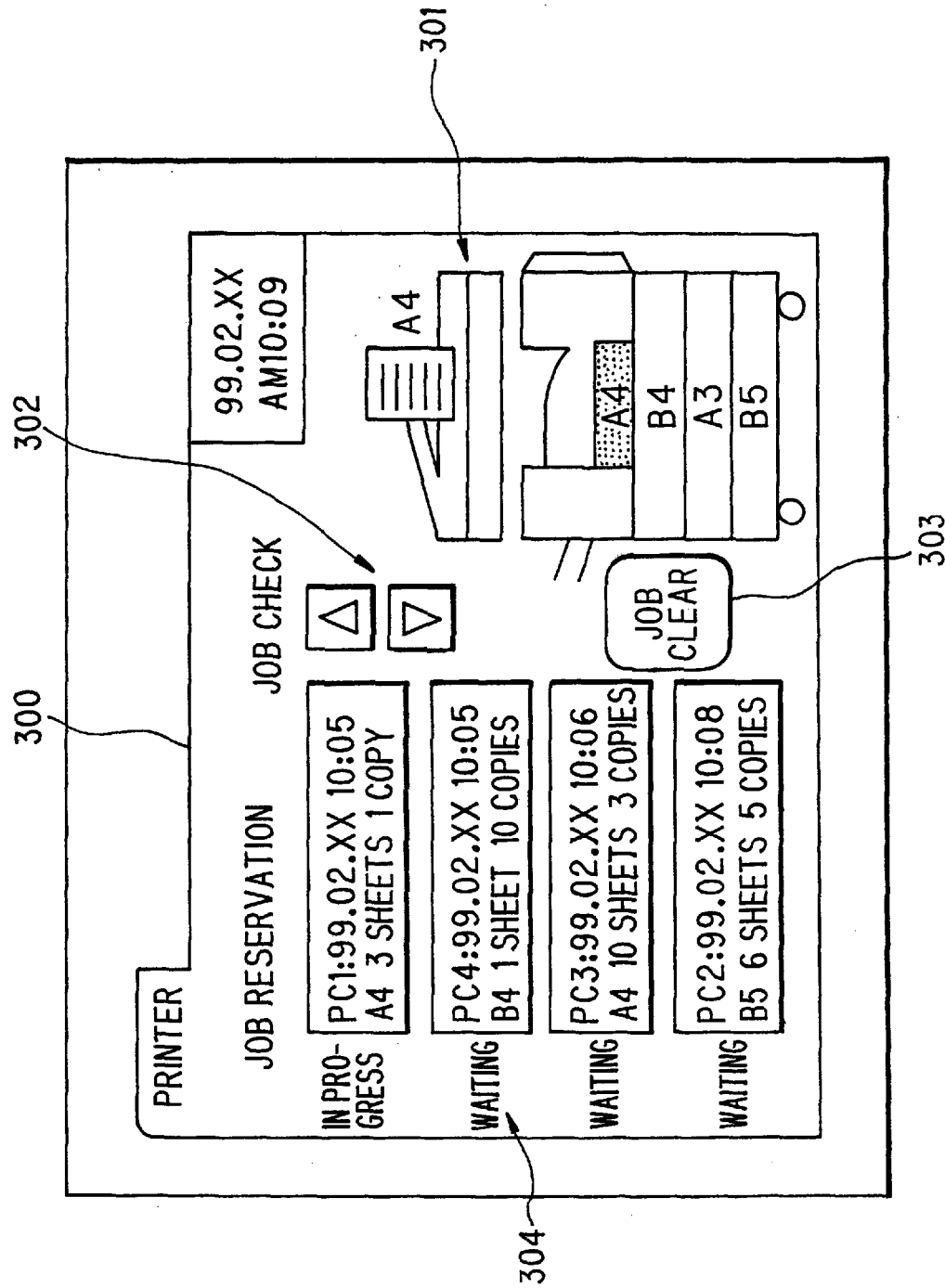
FIG. 8 is an outline showing the display frame in printer mode.

FIG. 8 shows the display frame in printer mode. This frame is configured of sets of information relating to variational mode over a blue background 300.

An external outline 301 of the digital copier is displayed in the approximately right area in background 300 so as to allow for confirmation of the current status of this digital copier such as the recording paper size, the conditions of peripherals, and the like. Displayed in the approximately center in background frame 300 are a key set 302 for scrolling the list of jobs if multiple printer jobs exit and cannot be viewed all at once and a job clear key 303 for clearing a job displayed in the list.

Further, displayed in the approximately left area in background frame 300 is a contents display 304 of a series of detailed information as to individual print jobs which have been loaded and displayed by using the aforementioned scroll key set 302. Once a desired one is selected by touch and then job clear key 303 is pressed, an arbitrary job can be cleared.

In the display frame shown in FIG. 8, the detailed information as to the printer mode and a group of keys designating the details in the printer mode, displayed in blue background 300 should be depicted with a color which is modified as to brightness and/or chroma with respect to the blue hue of the background frame. This provides easy visual understanding to the user that the frame indicates the information as to printer mode.

Further, if among the information item indicators and key sets displayed in background frame 300, basic information such as contents display 304 of the detailed job information, scroll key 302 and the like may be represented with an intense color, for example a dark color, while special key sets such as job clear key 303 etc., which are not frequently selected may be represented with a non-intense color, for example a light color, so that the display will appear hierarchically in color and the display contents will be easily, visually understandable to the user.

Alternatively, if among the information and key sets displayed in background frame 300, basic information such as contents display 304 of the detailed job information, scroll key 302 and the like may be represented with a color having a large color difference from that of background frame 300 while job clear key 303 and other keys which are not frequently selected may be represented with a color having a small color difference from that of background frame 300, so that the display will appear hierarchically in color, and the display contents will be visually easily understandable to the user.

(The Display Frame in Scanner Mode)

Figure 9:
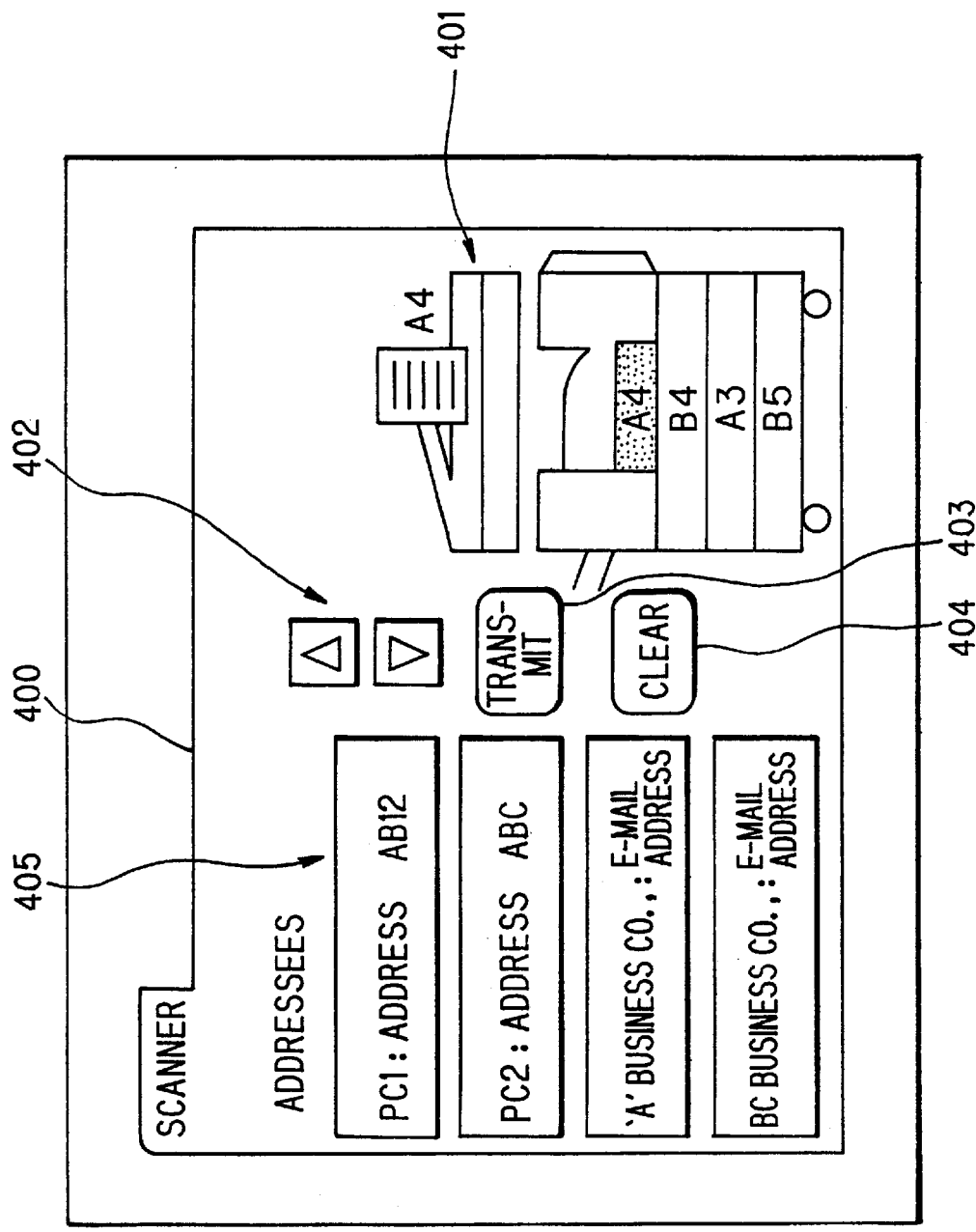
FIG. 9 is an outline showing the display frame in scanner mode.

FIG. 9 shows the display frame in scanner mode. This frame is configured of sets of information relating to variational modes over an yellow background 400.

An external outline 401 of the digital copier is displayed in the approximately right area in background 400, so as to allow for confirmation of the current status of this digital copier such as the recording paper size, the conditions of peripherals, and the like. Further, displayed in the approximately central area in background frame 400 are a scroll key set 402 for scrolling multiple pieces of sending address information, a transmission key 403 for commanding transmission of the original image information captured by the scanner to arbitrarily designated addressees, and a clear key 404 for clearing the transmission command.

Addressees information contents 405 such as names and addresses to which the original image information is to be sent are displayed in a successive manner in the approximately left area in background frame 400 so as to allow the user to select desired addressees from those displayed. In this scanner mode, differing from the facsimile mode, the image information of scanned originals is transmitted to a particular external information processing apparatus by way of the intra-network, i.e., local area network (LAN), the internet, etc.

In the display frame shown in FIG. 9, the contents display 405 of addressee information in the scanner mode and transmission command key 403 displayed in yellow background 400 should be depicted with a color which is modified as to brightness and/or chroma with respect to the yellow hue of the background frame. This provides easy visual understanding to the user that the frame indicates the information as to scanner mode.

Further, if among the information and key sets displayed in background frame 400, basic information contents display such as addressees etc., and key sets 403 may be represented with an intense color, for example a dark color, while mode clear key 404 and the like which are not frequently selected may be represented with a non-intense color, for example a light color, so that the display will appear hierarchically in color and the display contents will be easily, visually understandable to the user.

Alternatively, if among the information item indicators and key sets displayed in background frame 400, basic information contents display such as addressees etc., and key sets 403 may be represented with a color having a large color difference from that of background frame 400 while mode clear key 404 and the like which are not frequently selected may be represented with a color having a small color difference from that of background frame 400, so that the display will appear hierarchically in color and the display contents will be visually easily understandable to the user.

(Other Considerations)

In the above description, though the information table relating to a single mode is displayed on the color LCD device, it is necessary to make the user easily understand that the apparatus will handle multiple pieces of image information in parallel since the digital multi-functional machine (digital copier 10) has a function of handling multiple pieces of image information in parallel.

Figure 10:
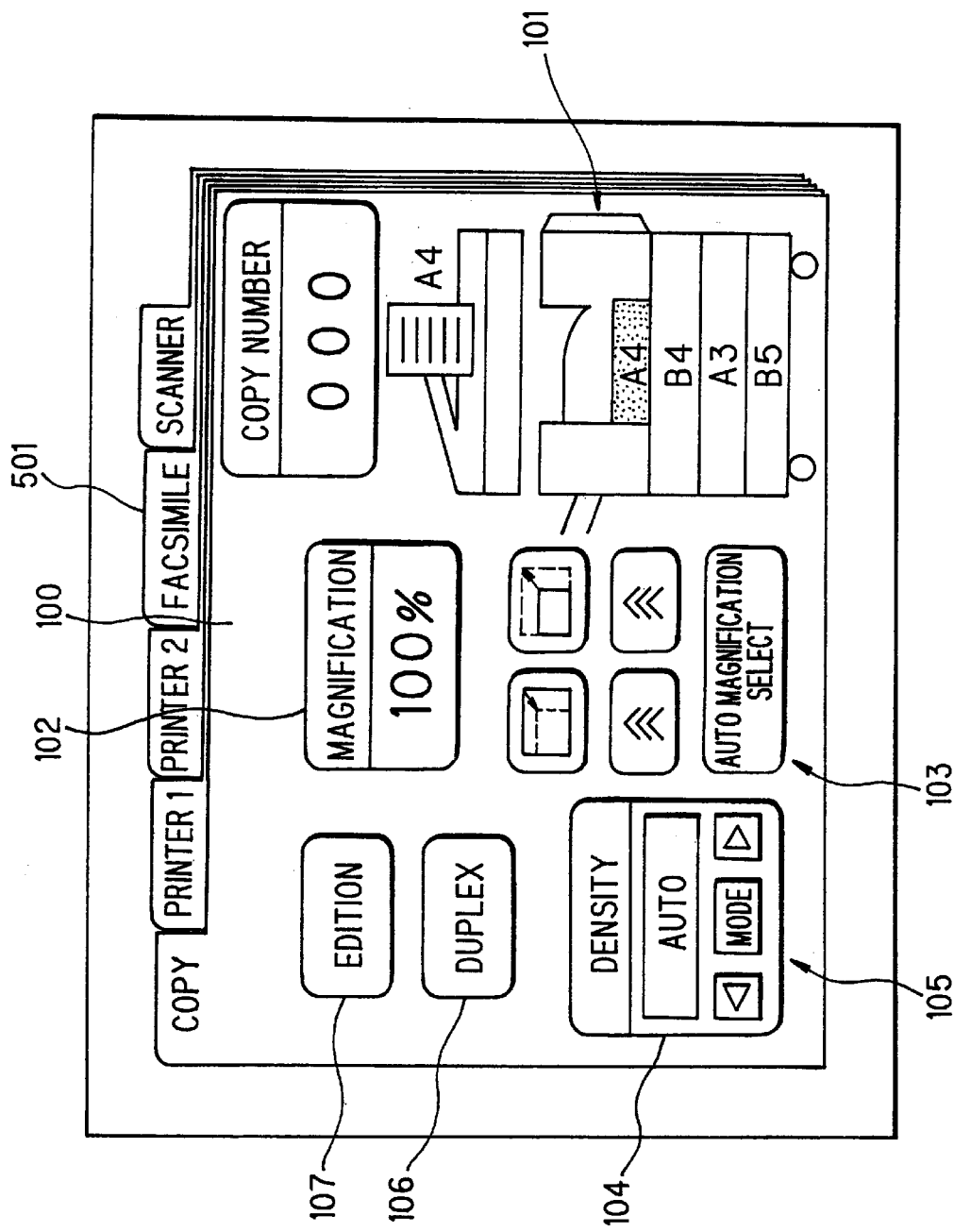
FIG. 10 is an outline showing the display frame in which all the functional modes are displayed in a superimposed manner.

For this purpose, as shown in FIG. 10, in order to show the presence of a multiple number of image information functions to be handled as the multi-functional machine, the information tables for individual functional modes displayed by different hues (colors) are three-dimensionally superimposed one over another and each information table of a functional mode represented by a different hue (color) is provided with a tab 501 so that all the tabs in the upper part are always displayed. The display of tabs 501 provides information as to what kinds of functions the apparatus has. In the case of FIG. 10, copy, printer 1, printer 2, facsimile and scanner modes can be effected in parallel.

When a desired tab 501 is touched (pressed), the information table of the function comes to appear to the frontmost layer on the display screen, allowing the user to check the conditions of the function.

According to the imaging apparatus of the present invention, as the means for displaying information as to each of multiple imaging modes, the information as to each mode is displayed in a guidance manner with a hue different from that in other modes while the information relating to the mode is depicted with a color which is modified as to brightness and/or chroma with respect to the hue. Therefore, it is possible to provide easily understandable guidance display (view) of an imaging mode to be engaged henceforward and the information as to the mode.

When the apparatus is in a state where imaging can be effected in multiple different functional modes, at least, partial guidance display of the information as to each of the multiple different functional modes is displayed in the display portion. Therefore, it is possible to simply grasp the information as to the imaging to be processed henceforward.

Since the information as to each mode displayed in the display device is displayed in the background of a color different from that in other modes while the basic information which is selected frequently (to be marked) is depicted with an intense color, for example a dark color, and the special information which is not frequently selected is depicted with a non-intense color, for example a light color, this configuration provides easy information confirmation and hence improved operativity while eliminating waste operations due to erroneous setting.

Since the information as to each mode displayed in the display device is displayed in the background of a color different from that in other modes while the basic information which is selected frequently (to be marked) is depicted with a color having a large color difference from the background color and the special information which is not frequently selected is depicted with a color having a small color difference from the background, this configuration provides easy information confirmation and hence improved operativity while eliminating waste operations due to erroneous setting.

What is claimed is:

1. An imaging apparatus for imaging in a multiple number of different functional modes, comprising:

a display portion having an information display portion for displaying information as to imaging in each functional mode;

an imaging portion for imaging based on the information displayed in the information display portion; and a display control portion for controlling the information display portion so that the information as to imaging in each functional mode will be displayed with a hue different from that in the other functional modes while the display is depicted with a color which is modified as to, at least, brightness or chroma with respect to the hue;

wherein the information display portion displays the information as to the imaging conditions in each functional mode so that they can be selected and the contents of the selected conditions can be confirmed.

2. The imaging apparatus according to claim 1, wherein when the apparatus is in a state where imaging can be effected in multiple different functional modes, the display control portions controls the information display portion so as to provide, at least, display guidances being a part of the information as to each of the different functional modes with the associated color.

3. The imaging apparatus according to claim 1, wherein the information display portion for each functional mode, at least, includes a basic information display group for displaying basic information for imaging and a special information display group for displaying special information, and the display control portion controls the information display portion so that the basic information display group is depicted with an intense color while the special information display group is depicted with non-intense color.

4. An imaging apparatus according to claim 1, wherein the information display portion for each functional mode is, at least, composed of a basic information display group for displaying basic information for imaging and a special information display group for displaying special information in a background color, and the display control portion controls the information display portion so that the basic information display group is depicted with a color having a large color difference from the background color while the special information display group is depicted with a color having a small difference from the background color.

5. The imaging apparatus according to claim 2, wherein the information display portion for each functional mode is at least, composed of a basic information display group for displaying basic information for imaging and a special information display group for displaying special information, and the display control portion controls the information display portion so that the basic information display group is depicted with an intense color while the special information display group is depicted with a non-intense color.

6. The imaging apparatus according to claim 2, wherein the information display portion for each functional mode is, at least, composed of a basic information display group for displaying basic information for imaging and a special information display group for displaying special information in a background color, and the display control portion controls the information display portion so that the basic information display group is depicted with a color having a large color difference from the background color while the special information display group is depicted with a color having a small color difference from the background color.

* * * * *